United States Patent [19]
de Jong et al.

[11] Patent Number: 5,348,999
[45] Date of Patent: Sep. 20, 1994

[54] POLYMER MIXTURE COMPRISING AROMATIC POLYCARBONATE, POLYBUTYLENE TEREPHTHALATE AND POLYALKYLENE GLYCOL

[75] Inventors: Robertus E. de Jong; Torben P. Kempers, both of Bergen op Zoom; Gerrit de Wit, Ossendrecht, all of Netherlands

[73] Assignee: General Electric Company, Pittsfield, Mass.

[21] Appl. No.: 866,957

[22] Filed: Apr. 9, 1992

Related U.S. Application Data

[63] Continuation of Ser. No. 580,454, Sep. 11, 1990, abandoned.

[30] Foreign Application Priority Data

Sep. 15, 1989 [NL] Netherlands .......................... 8902313

[51] Int. Cl.$^5$ ...................... C08L 67/02; C08L 69/00; C08L 71/02
[52] U.S. Cl. ...................... 524/377; 534/378; 534/537; 525/67; 525/408; 525/411; 525/413; 525/439; 428/412
[58] Field of Search .......................... 524/377, 378, 537; 525/67, 408, 411, 413, 439

[56] References Cited

U.S. PATENT DOCUMENTS

| | | | |
|---|---|---|---|
| 3,169,121 | 2/1965 | Goldberg | 528/173 |
| 4,001,184 | 1/1977 | Scott | 528/182 |
| 4,125,572 | 11/1978 | Scott | 524/449 |
| 4,257,937 | 3/1981 | Cohen et al. | 525/67 |
| 4,280,949 | 7/1981 | Dieck | 525/67 |
| 4,404,242 | 9/1983 | Squier | 524/377 |
| 4,433,088 | 2/1984 | Haaf | 525/66 |
| 4,535,124 | 8/1985 | Binsack et al. | 525/67 |
| 4,554,315 | 11/1985 | Chung et al. | 525/67 |
| 4,600,743 | 7/1986 | Shizuki | 524/377 |
| 4,634,732 | 1/1987 | Miller | 525/67 |
| 4,636,544 | 1/1987 | Hepp | 524/411 |
| 4,900,748 | 2/1990 | Tabankia et al. | 525/67 |
| 4,904,729 | 2/1990 | Laughner | 525/408 |
| 4,942,188 | 7/1990 | Hamersma et al. | 523/212 |
| 4,966,942 | 10/1990 | Sasaki | 525/67 |
| 5,010,139 | 4/1991 | Yu | 525/408 |

FOREIGN PATENT DOCUMENTS

| | | |
|---|---|---|
| 0079477 | 5/1983 | European Pat. Off. . |
| 0107048 | 5/1984 | European Pat. Off. . |
| 0110222 | 6/1984 | European Pat. Off. . |
| 0158822 | 10/1985 | European Pat. Off. . |
| 0239157 | 9/1987 | European Pat. Off. . |
| 1569296 | 6/1980 | United Kingdom . |

OTHER PUBLICATIONS

Kirk–Othmer, vol. 3 (1978) pp. 167–171.
Kirk–Othmer, vol. 18 (1982) pp. 616–645.

*Primary Examiner*—David J. Buttner

[57] ABSTRACT

The invention relates to polymer mixtures which comprise an aromatic polycarbonate, a polybutylene terephthalate and a polyalkylene glycol. Due to the presence of the polyalkylene glycol a good lacquer bonding is obtained when lacquer systems on the basis of water are used.

11 Claims, No Drawings

POLYMER MIXTURE COMPRISING AROMATIC POLYCARBONATE, POLYBUTYLENE TEREPHTHALATE AND POLYALKYLENE GLYCOL

This is a continuation of application Ser. No. 07/580,454 filed Sep. 11, 1990 now abandoned.

The invention relates to a polymer mixture which comprises a polybutylene terephthalate and an aromatic polycarbonate.

Such mixtures are known per se. For this purpose reference may be made, for example, to GB-A-1569296.

U.S. Pat. No. 4,257,937 and U.S. Pat. No. 4,280,949 disclose polymer mixtures which comprise a polybutylene terephthalate, a polycarbonate, and an agent to improve the impact strength.

The known mixtures generally have favourable properties: they have good mechanical properties and can withstand the influence of organic solvents. As a result of this the said mixtures are suitable for manufacturing therefrom parts for motor-cars, for example, bumpers. It is sometimes desired to provide the articles formed from the polymer mixture with a decorative layer of lacquer. In the known polymer mixture bonding problems may then occur between the surface and the layer of lacquer.

The bonding of the lacquer is determined both by the polymeric composition of the substrate and by the type of lacquer system. When lacquer systems on the basis of water are used, the lacquer bonding is different from anhydrous systems.

The invention provides polymer mixtures which comprise A. a polybutylene terephthalate and B. an aromatic polycarbonate to which a polyalkylene glycol polymer or a polyalkylene glycol copolymer (C) has been added which ensures a better bonding to the layer of lacquer.

The polymer mixture according to the invention is characterised in that it comprises 0.1–5 parts by weight of a polyalkylene glycol polymer or a polyalkylene glycol copolymer (C) per 100 parts by weight of A+B. The polymer mixture according to the invention preferably comprises a polyethylene glycol.

Per 100 parts by weight of constituents A plus B the quantity by weight of A is preferably 10–90 parts and that of B is preferably 90–10 parts.

The polymer mixture according to the invention may comprise 0.1–100 parts by weight of conventionally used additives per 100 parts by weight of A+B.

The polymer mixture according to the invention preferably comprises 0.1–50 parts by weight of an agent to improve the impact strength per 100 parts by weight of A+B.

A core-shell polymer built up from a rubber-like core on which one or more shells have been grafted is preferably used as an agent to improve the impact strength.

The polymer mixture according to the invention comprises at any rate the following constituents:
A. one or more polybutylene terephthalates,
B. one or more aromatic polycarbonates, and
C. a polyalkylene glycol.

The polymer mixture may comprise one or more of the following constituents:
D. conventionally used additives,
E. one or more agents to improve the impact strength.

A. Polybutylene Terephthalate

Polybutylene terephthalate is a polymer known per se. It is derived from butane-1,4-diol and terephthalic acid. It is possible to use copolyesters in the polymer mixtures in which a part of the diol compound and/or a part of the terephthalic acid has been replaced by another diol and/or carboxylic acid. For the polymer mixture according to the invention it is preferred to use a polybutylene terephthalate which is built up for more than 70 mol % from units derived from butane-1,4-diol and terephthalic acid.

It is possible to use polybutylene terephthalate in which a branching agent, for example, a glycol having three or more hydroxyl groups or a three-fold or multi-functional carboxylic acid has been incorporated.

B. Aromatic Polycarbonate

Aromatic polycarbonates are materials known per se. They are generally prepared by reacting a dihydric phenol compound with a carbonate precursor, for example, a halogen formale or a carbonate ester. Aromatic polycarbonates are polymers which comprise units of the formula

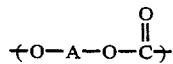

wherein A is a bivalent aromatic radical which is derived from the dihydric phenol used in the preparation of the polymer. Mononuclear or polynuclear aromatic compounds may be used as dihydric phenols in the preparation of the aromatic polycarbonates, which compounds comprise two hydroxy radicals each directly bonded to a carbon atom of an aromatic nucleus.

The known branched polycarbonates as described, for example, in U.S. Pat. No. 4,001,184 are also suitable.

Suitable aromatic polycarbonates are also the so-called polyester carbonates which are obtained by performing the polymerisation reaction in the presence of an ester precursor, for example, a difunctional carboxylic acid, for example, terephthalic acid or an ester-forming derivative thereof. These polyester carbonates comprise ester compounds and carbonate compounds in the polymeric chain. Polyester carbonates are described, for example, in U.S. Pat. No. 3,169,121.

C. Polyalkylene Glycol Polymer or Polyalkylene Glycol Copolymer.

Polyalkylene glycol polymers or copolymers are compounds known per se. Polyalkylene glycol is mentioned notably as an additive for synthetic resins: it provides inter alia antistatic properties. For this purpose, reference may be made, for example, to Kirk-Othmer, Encyclopedia of Chemical Technology, 3rd edition, vol. 3, 1978, pp. 167–171. The preparation and various uses of these (co)polymers are described for instance in Kirk Othmer, volume 18, pp. 616–645.

These copolymers may be obtained by polymerisation of one or more different alkene oxides, for example, ethylene oxide and/or propylene oxide and/or butylene oxide. The molecular weight may be chosen between 200 and 20,000, preferably between 500 and 5,000. Block copolymers with propylene oxide blocks and ethylene oxide blocks are preferably used.

A polyalkylene glycol having a molecular weight of approximately 3500 g/mol is preferably used in the polymer mixture according to the invention.

D. Conventionally Used Additives

In addition to the constituents mentioned hereinbefore the polymer mixture according to the invention may comprise one or more additives. Examples of suitable additives are stabilisers, transesterification inhibitors, dyes, pigments, fillers, and reinforcing fibres, for example, glass fibres, and release agents.

E. Agents to Improve the Impact Strength

The polymer mixture according to the invention may comprise one or more agents to improve the impact strength.

So-called core-shell polymers are preferably used which are built up from a rubber-like core on which one or more shells have been grafted. The core usually consists substantially of an acrylate rubber or a butadiene rubber.

One or more shells have been grafted on the core. Usually these shells are built up for the greater part from a vinylaromatic compound and/or a vinyl cyanide and or an alkyl (meth)acrylate and/or (meth)acrylic acid. The core and/or the shell(s) often comprise(s) multifunctional compounds which may work as a cross-linking agent and/or a grafting agent. The said polymers are usually prepared in several stages.

The polymer mixture according to the invention may be obtained according to any conventionally used method of preparing polymer mixtures. Preferably, the individual constituents are collectively mixed in the melt (compounded) in an extruder. The extrudate (in strand form) which emanates from the extruder may be chopped into pellets. The pellets may be further processed, for example, in an injection moulding machine.

Example I, Comparative Examples A, B and C

Various polymer mixtures were prepared starting from the following constituents:

PBT: a polybutylene terephthalate having an intrinsic viscosity of 1.19 dl/g measured in a 60/40 mixture of phenol and tetrachloroethane at 25° C.

PC: an aromatic polycarbonate derived from bisphenol A and phosgene having an intrinsic viscosity of 53 ml/g measured in methylene chloride at 25° C.

IM: an agent to improve the impact strength of the core-shell type having a core consisting substantially of a butadiene rubber on which a shell of a copolymer which is built up substantially of methyl methacrylate has been grafted.

ST: A mixture of several conventionally used stabilisers

SF: a dimethyl silicone fluid having a nominal viscosity of 500 ctks at 25° C.

PEG: a polyethylene glycol having a molecular weight of approximately 3500 g/mol.

The various constituents were compounded in a Werner & Pfleiderer extruder in the quantities as indicated in the table hereinafter (average value of the adjusted temperatures: 235° C.) The resulting extrudate was chopped into pellets. From the pellets plates were injection-moulded for the determination of the lacquer bonding (dimensions of the plates: length×width 175×175 mm, thickness 3 mm).

The surface was painted by means of a spray gun. A water-borne primer, no. 62070 on the basis of water, from Messrs.Woerwag was used as a lacquer. The lacquered plates were first cured at 780° C. for 15 minutes and then conditioned at 50° C. for 48 hours. The bonding strength was then determined according to DIN 53151 with TESA® tape 4651. An evaluation "GtO" indicates a good bonding; an evaluation "Gt5" indicates a poor bonding.

The results obtained are recorded in the table hereinafter.

TABLE

Examples I, comparative examples A, B and C

| Composition (parts by weight) | A | B | C | I |
|---|---|---|---|---|
| PC | 49 | 49 | 49 | 49 |
| PBT | 40 | 39 | 39 | 39 |
| IM | 10 | 10 | 10 | 10 |
| ST | 0.63 | 0.63 | 0.63 | 0.63 |
| SF | — | 0.5 | 1 | — |
| PEG | — | — | — | 1 |
| Lacquer bonding: | Gt4 | Gt3 | Gt5 | Gt0 |

It may be seen from the table that the addition of polyethylene glycol (example I) leads to an actual improvement of the lacquer bonding. A dimethyl silicone fluid (comparative examples B and C) provides only a slight improvement when using a lacquer based on water, or it provides a deterioration of the lacquer bonding.

We claim:

1. A polymer mixture which comprises (A) a polybutylene terephthalate and (B) an aromatic polycarbonate, characterised in that the polymer mixture comprises (C) 0.1–5 parts by weight of a polyalkylene glycol selected from the group consisting of polyalkylene glycol polymers and polyalkylene glycol copolymers per 100 parts by weight of A+B, said polyalkylene glycol having a molecular weight between 200 and 20,000 g/mol, said polyalkylene glycol being present in an amount sufficient to improve lacquer bonding to injection molded articles formed from said polymer mixture.

2. A polymer mixture as claimed in claim 1, characterised in that the polymer mixture comprises polyethylene glycol.

3. A polymer mixture as claimed in claim 1, characterized in that the polymer mixture comprises 0.1–100 parts by weight of one or more additives selected from the group consisting of an agent to improve the impact strength, stabilizers, transesterification inhibitors, dyes, pigments, fillers, reinforcing fibres and release agents per 100 parts by weight of A+B.

4. A polymer mixture as claimed in claim 1, characterised in that the polymer mixture comprises 0.1–50 parts by weight of an agent to improve the impact strength per 100 parts by weight of A+B.

5. A polymer mixture as claimed in claim 1, characterized in that the polymer mixture comprises an agent to improve the impact strength, said agent being a core shell polymer which is built up from a rubber core on which one or more shells have been grafted.

6. A polymer mixture as claimed in claim 1, wherein the polyalkylene glycol is a block copolymer of propylene oxide and ethylene oxide having a molecular weight of 500 to 20,000 g/mol.

7. A polymer mixture as claimed in claim 1, wherein the polyalkylene glycol is a block copolymer of propylene oxide and ethylene oxide having a molecular weight of 500 g/mol to 5,000 g/mol.

8. A polymer mixture as claimed in claim 1, wherein, per 100 parts by weight of polybutylene terephthalate and aromatic polycarbonate, the weight of the polybutylene terephthalate is 10 to 90 parts and the weight of the aromatic polycarbonate is 90–10 parts.

9. The polymer mixture of claim 1, wherein the polymer mixture further comprises 0.1–100 parts by weight of at least one additive selected from the group consisting of stabilizers, transesterification inhibitors, dyes, pigments, fillers, reinforcing fibers and release agents per 100 parts by weight of (A)+(B).

10. A polymer mixture which consists essentially of (A) a polybutylene terephthalate, (B) an aromatic polycarbonate, and (C) a polyalkylene glycol having a molecular weight of between 500 g/mol and 5,000 g/mol, said polyalkylene glycol being present at a level of from 0.1–5 parts by weight per 100 parts by weight of A+B, said polyalkylene glycol being present at a level sufficient to improve the bonding of lacquer to injection molded articles formed from the polymer mixture.

11. The polymer mixture of claim 10 wherein said polyalkylene glycol is polyethylene glycol.

* * * * *